L. E. WATERMAN.
HARROW.
APPLICATION FILED DEC. 26, 1912.

1,137,934.

Patented May 4, 1915.

Witnesses:
W. L. Dow
E. Behel

Inventor:
L. E. Waterman
By A. O. Behel
Atty.

UNITED STATES PATENT OFFICE.

LEWIS E. WATERMAN, OF ROCKFORD, ILLINOIS, ASSIGNOR TO EMERSON-BRANTINGHAM COMPANY, OF ROCKFORD, ILLINOIS, A CORPORATION OF ILLINOIS.

HARROW.

1,137,934. Specification of Letters Patent. Patented May 4, 1915.

Application filed December 26, 1912. Serial No. 738,734.

*To all whom it may concern:*

Be it known that I, LEWIS E. WATERMAN, a citizen of the United States, residing at Rockford, in the county of Winnebago and the State of Illinois, have invented certain new and useful Improvements in Harrows, of which the following is a specification.

The object of this invention is to provide an improved construction of harrow and more particularly to provide an improved method of operating the several gangs in a harrow of the type as described in my patent for harrows, No. 984,625, dated Feb. 21, 1911.

Figure 1:
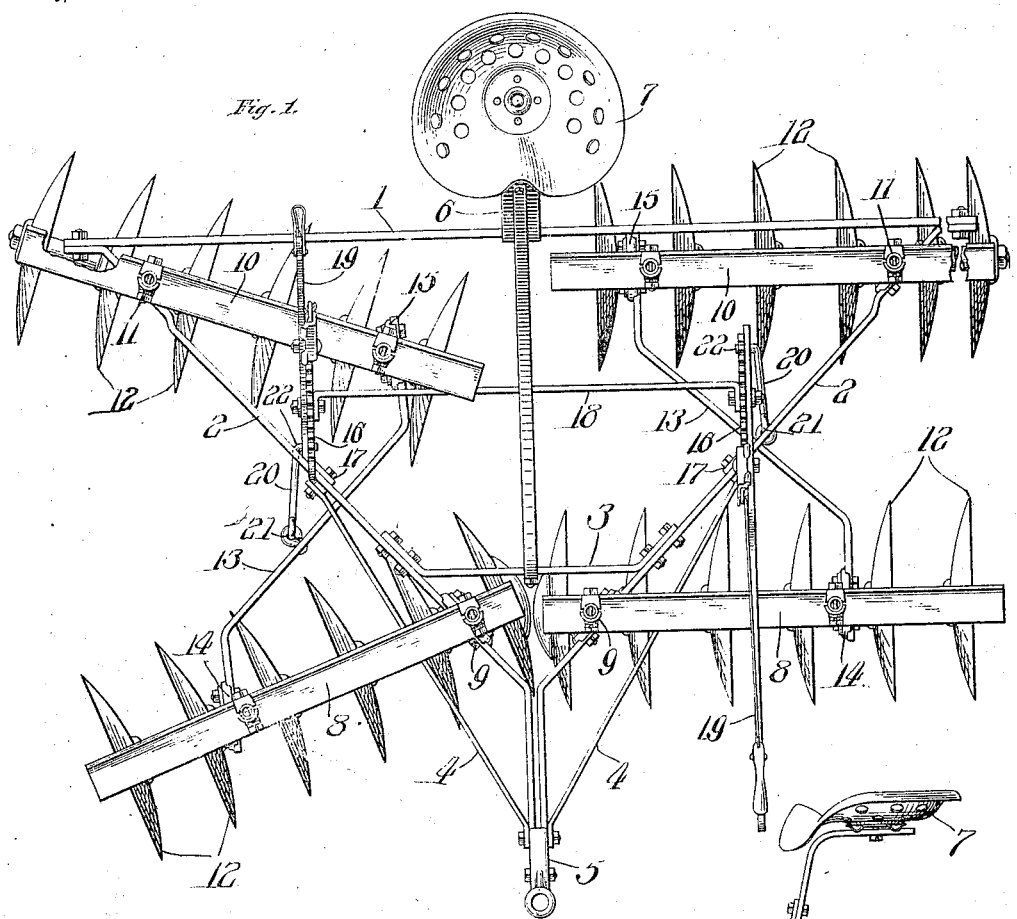
Figure 2:
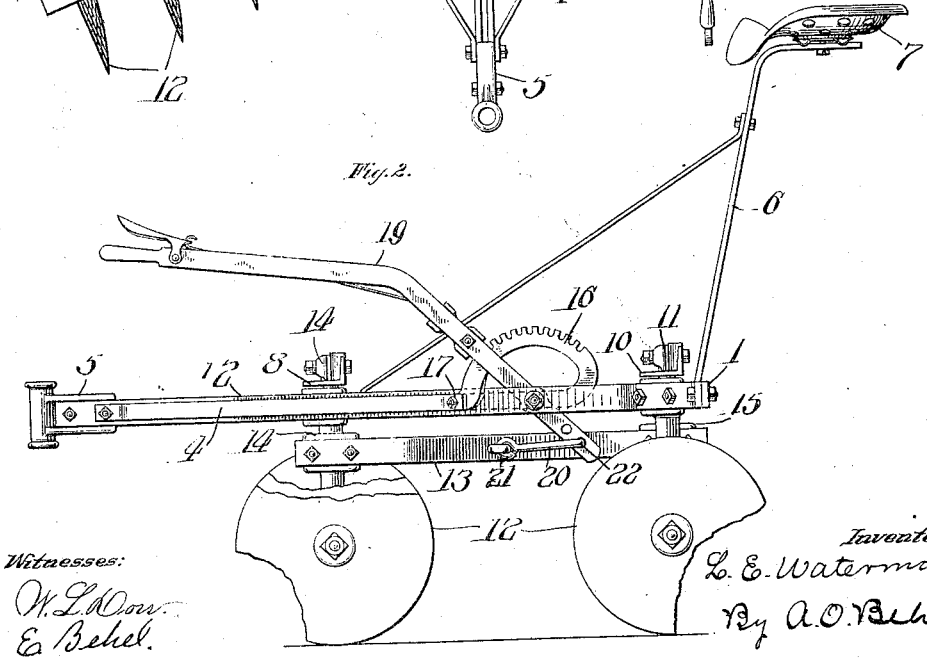

In the accompanying drawings: Figure 1 is a plan view of my improved harrow showing the gangs on one side thereof shifted to an angle oblique to the line of draft. Fig. 2 is an elevation of the side of the harrow with the gangs parallel, a portion of the forward disk being broken away to show the pivotal connection of its gang.

A triangular frame comprises the rear-bar 1, the diagonally arranged side-bars 2, the side-bars braced by the bar 3 and links 4, and having a bracket 5 connecting their forward ends and serving as means to which draft is applied to the harrow. The seat support 6 carrying seat 7 is supported by the rear-bar 1.

Front and rear gangs are carried by each of the side-bars 2 and are of duplicate construction. The front angle-supports 8 are pivotally supported near their inner ends by brackets 9 which are secured to the side-bars 2 near the front portion thereof, and the rear angle-supports 10 are pivotally supported near their outer ends by the brackets 11 which are secured to the side-bars 2 to the rear portion thereof. Suitably mounted and carried by the angle-supports 8 and 10 are earth agitating means, having here shown a plurality of rotary disks 12, suitably spaced.

The diagonally arranged connecting-bars 13 are pivotally connected by brackets 14 to the front angle-supports 8 at a point to the outer side of the pivotal supports thereof, and the opposite ends of the connecting-bars are pivotally connected by brackets 15 to the rear angle-supports 10 at point to the inner side of the pivotal supports thereof, the connecting-bars 13, when the gangs are at right angles to the line of draft, lying substantially at right angles to the side-bars 2 as is shown clearly in Fig. 1.

Toothed-segments 16 are bolted to the side-bars at 17, are braced by the bar 18, and form the pivotal support for the hand-levers 19 which are provided with the usual thumb and dog connections for engaging the toothed-segments. Connecting-links 20 have a hooked pivotal connection 21 with the connecting-bars 13, and an adjustable pivotal connection 22 with the lower end of the hand-levers. This adjustable connection is to allow the gangs to be swung at various angles to the line of draft.

With the gangs all lying parallel and at right angles to the line of draft, by actuating levers 19, the several gangs are swung on their respective axis, through the medium of links 20 and connecting-bars 13, the disks of the front gangs pointing inward and those of the rear gangs pointing outward as is illustrated on one side of the harrow in Fig. 1, and for the purpose of reharrowing the ground and leaving it in a smooth and level condition.

I claim as my invention:

1. The combination of a frame having diagonally arranged side sections, front and rear earth agitating devices pivotally connected to the side sections at diagonally opposite ends of the devices, bars connecting said devices at the inner side of the pivots of the rear devices and at the outer sides of the pivots of the front devices, notched segments carried by said side sections at points intermediate the devices, levers pivoted to the segments and having a dog engagement therewith, and links connecting the levers and said connecting bars, the actuation of said levers being adapted to swing the devices to positions at an angle to the line of draft.

2. An earth agitating device comprising a draft member, a pair of frame members connected thereto and diverging rearwardly therefrom, a transverse frame member connecting the rear portions of said diverging frame members, a pair of earth agitating gangs pivotally connected to each of said diverging side members, each pair of gangs being arranged to comprise forward and rear gangs with the rear gangs pivotally attached at their outer ends and the forward gangs pivotally attached at their inner ends to the diverging frame members, means connecting the inner and outer ends of the rear and forward gangs respectively for swinging the gangs on their axes, and a seat-bar carried by the frame.

3. In a tandem harrow, the combination of a draft member, a pair of frame members connected thereto and diverging rearwardly therefrom, a transverse frame member connecting the rear ends of said diverging frame members, a pair of harrowing tools arranged in tandem relation at each side of the harrow and each pivotally connected to a divergingly extending frame member, the rear harrowing tools being pivotally connected at their outer ends and the front harrowing tools at their inner ends, a bar connecting the harrowing tools of each pair at the sides thereof opposite their pivot whereby upon moving said bar forwardly or rearwardly the harrowing tools may be angled with respect to the line of draft, a lever pivotally mounted on each diverging frame member, and a connection between each lever and the adjacent bar for moving the bar to angle the harrowing tools.

In testimony whereof I have hereunto set my hand in presence of two subscribing witnesses.

LEWIS E. WATERMAN.

Witnesses:
JOHN F. McCANNA, Jr.,
E. D. E. N. BEHEL.